United States Patent
Waehrisch et al.

(10) Patent No.: US 9,677,332 B2
(45) Date of Patent: Jun. 13, 2017

(54) DRIVE ACTUATOR

(71) Applicant: Johnson Electric S.A., Murten (CH)

(72) Inventors: Sten Waehrisch, Dresden (DE); Matthias Kulke, Dresden (DE); Wolfgang Winkler, Dresden (DE)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 15/140,984

(22) Filed: Apr. 28, 2016

(65) Prior Publication Data

US 2016/0319598 A1    Nov. 3, 2016

(30) Foreign Application Priority Data

Apr. 30, 2015  (DE) .................. 10 2015 106 833

(51) Int. Cl.

| | | |
|---|---|---|
| *E06B 9/84* | (2006.01) | |
| *F16D 49/16* | (2006.01) | |
| *F16D 59/02* | (2006.01) | |
| *F16D 63/00* | (2006.01) | |
| *E06B 9/40* | (2006.01) | |

(Continued)

(52) U.S. Cl.
CPC ................ *E06B 9/84* (2013.01); *E06B 9/40* (2013.01); *E06B 9/72* (2013.01); *F16D 49/16* (2013.01); *F16D 51/10* (2013.01); *F16D 59/00* (2013.01); *F16D 59/02* (2013.01); *F16D 63/006* (2013.01); *F16D 2121/14* (2013.01); *F16D 2127/002* (2013.01)

(58) Field of Classification Search
CPC ... E06B 9/40; E06B 9/84; F16D 43/18; F16D 43/22; F16D 43/211
USPC ...... 188/74, 78, 82.2, 82.7, 181 T, 184, 186; 192/12 BA, 105 BA, 105 CD
See application file for complete search history.

(56) References Cited

U.S. PATENT DOCUMENTS 2,451,373 A  * 10/1948  Beall ................... B61L 29/243
                                                          188/180
2,596,193 A  *  5/1952  Zieg, Jr. ................ F16D 43/18
                                                          192/105 CD (Continued)

FOREIGN PATENT DOCUMENTS

| DE | 2528719 A1 | 1/1977 |
|---|---|---|
| DE | 202005007921 | 8/2005 |

(Continued)

*Primary Examiner* — Christopher Schwartz
(74) *Attorney, Agent, or Firm* — Muncy, Geissler, Olds & Lowe, P.C.

(57) ABSTRACT

An actuator drive, for blinds, roller shutters and the like, has a drive motor and a centrifugal brake. A rotational disk is coupled to a drive shaft of the drive motor via a shaft flange. Two centrifugal shoes are smoothly guided in the rotational disk. In the unpowered state, brake shoes of the centrifugal shoes engage, frictionally or in a positive-locking way on an outer surface of a friction ring fixed to the motor housing. Upon starting of the drive motor, the brake shoes release the friction ring. The radial displacement of the brake shoes is maintained until the drive motor comes to a stop, wherein the brake shoes 8 are drawn radially inward by spring elements and function again as a locking mechanism. The spring elements are pretensioned such that the brake shoes effect a sufficient retaining torque.

11 Claims, 3 Drawing Sheets

(51) Int. Cl.
*E06B 9/72* (2006.01)
*F16D 51/10* (2006.01)
*F16D 59/00* (2006.01)
F16D 121/14 (2012.01)
F16D 127/00 (2012.01)

(56) References Cited

U.S. PATENT DOCUMENTS

| | | | | |
|---|---|---|---|---|
| 2,718,294 A | * | 9/1955 | Armstrong | F16D 43/18 |
| | | | | 192/105 BA |
| 2,762,483 A | * | 9/1956 | Clark | F16D 41/00 |
| | | | | 192/105 BA |
| 3,971,462 A | * | 7/1976 | Johansson | F16D 43/18 |
| | | | | 192/103 B |
| 4,216,848 A | | 8/1980 | Shimodaira | |
| 4,226,312 A | * | 10/1980 | Zindler | A01D 34/6812 |
| | | | | 188/259 |
| 4,892,175 A | * | 1/1990 | Van Erden | F16D 67/02 |
| | | | | 192/104 C |
| 5,172,573 A | * | 12/1992 | Sharp | D06F 37/40 |
| | | | | 192/108 |
| 5,582,279 A | * | 12/1996 | Buchanan, Jr. | B60J 5/06 |
| | | | | 192/104 B |
| 6,550,597 B2 | | 4/2003 | Taniguchi | |
| 8,567,562 B2 | | 10/2013 | Meillet et al. | |
| 2004/0108173 A1 | | 6/2004 | Smith et al. | |
| 2007/0080033 A1 | | 4/2007 | Kowatsch | |
| 2013/0118856 A1 | | 5/2013 | Long | |

FOREIGN PATENT DOCUMENTS

| | | |
|---|---|---|
| EP | 2234245 | 9/2010 |
| GB | 391548 A | 5/1933 |
| GB | 1349748 A | 4/1974 |

* cited by examiner

DRIVE ACTUATOR

CROSS REFERENCE TO RELATED APPLICATIONS

This non-provisional patent application claims priority under 35 U.S.C. §119(a) from Patent Application No. 10 2015 106 833.8 filed in Germany on Apr. 30, 2015, the entire contents of which are hereby incorporated by reference.

FIELD OF THE INVENTION

This invention relates to a drive actuator for a roller shutter, blind, screen or the like and in particular, to a drive actuator having a centrifugal brake.

BACKGROUND OF THE INVENTION

In principle, there are already a large number of different individual technical solutions known as active or as passive braking systems for roller shutter and blind drives. Drives with active electromagnetic or electromechanical brakes use additional energy and generate significant switching noise during actuation. In addition, these require a relatively large installation space, as is apparent from EP 2,234,245 and DE 202005007921 (U). The advantage of a passively functioning braking system lies in the fact that it needs no auxiliary energy and requires a smaller installation space.

US2007/0080033(A1) describes a centrifugal brake comprising a brake drum at least partially overlapping the rotational element and comprising at least one centrifugal shoe, which is essentially radially moveable between the rotational element and an inner wall of the brake drum and is arranged on the rotational element. An additional braking unit is provided, which is triggered by the rotational element upon exceeding a predetermined rotational speed. By this means, the rotational element may be brought to a stop relatively quickly. Such brakes do not generally function directly for a strong or rigid locking of a rotational speed, but instead only limit the same. The centrifugal shoes begin to move radially outward from the rest position beginning at a specific rotational speed due to the centrifugal force affecting them. Upon reaching a specific switch-on rotational speed, the centrifugal shoes come into contact with the brake drum such that friction, and a braking effect connected thereto, occurs. In specific applications, the brake drums also function to stop the rotational element.

A brake unit for a rod-like element is known from U.S. Pat. No. 4,216,848, in which the centrifugal shoes may be brought into contact with a so-called brake shoe such that the latter rotates and moves axially on the rod. A brake wheel is thereby pressed against a brake disk and by this means the rod-like element is ultimately braked.

SUMMARY OF THE INVENTION

Hence there is a desire for a drive actuator having a centrifugal brake for holding the shaft stationary when the actuator is unenergised.

Accordingly, in one aspect thereof, the present invention provides a drive actuator, comprising: a drive motor, including a drive shaft and a motor housing; and a centrifugal brake coupled to the drive motor, the centrifugal brake comprises: a rotational disk coupled to the drive shaft; a friction ring fixed with respect to the motor housing; two or more centrifugal shoes arranged to be radially moveable between an inner position and an outer position and guided in the rotational disk; and at least one spring element urging the centrifugal shoes radially inwardly towards the inner position, wherein the centrifugal shoes engage frictionally or in a positive-locking way with the frictional ring when the drive motor is stationary, and move out of engagement with the friction ring when the drive motor is rotating.

Preferably, the rotational disk is coupled to the drive shaft via a shaft flange.

Preferably, a stop is formed in the rotational disk to limit the radially outward movement of the centrifugal shoes.

Preferably, the centrifugal shoes have a projection arranged to engage the stop.

Preferably, the stop is formed by a pair of recesses formed in the rotational disk and each projection extends into a respective recess.

Preferably, the friction ring is fixed to the motor housing.

Preferably, each centrifugal shoe has a brake shoe arranged to engage a radially outer surface of the friction ring.

Preferably, the brake shoes and the friction ring have a non-smooth contact surface creating positive locking engagement when the brake shoes engage the friction ring.

Preferably, the non-smooth contact surfaces have a saw-tooth configuration.

Preferably, the centrifugal shoes are interconnected by the at least one spring element.

Preferably, there are two spring elements interconnecting the centrifugal shoes.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
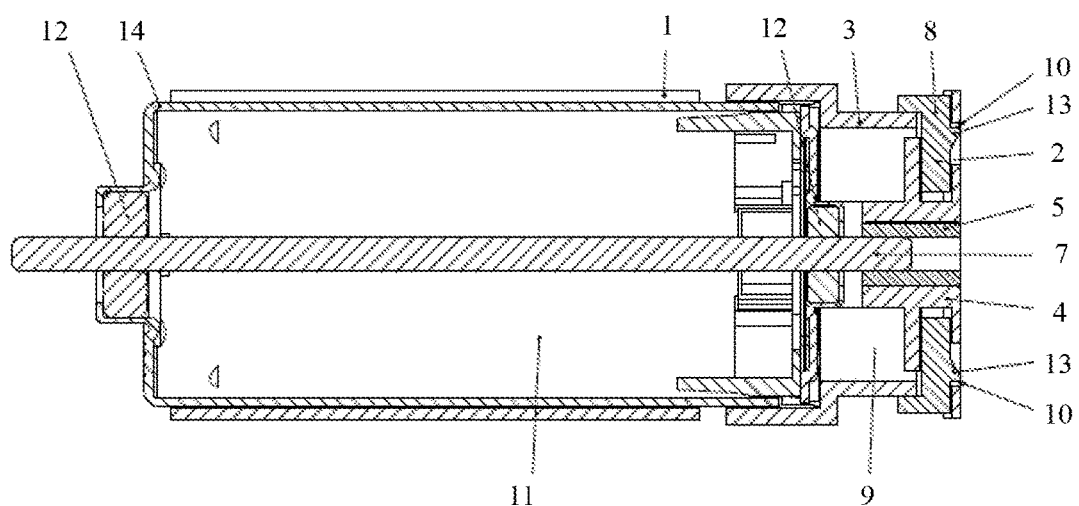
FIG. 1 is a schematic sectional view through a drive actuator according to a preferred embodiment of the present invention.
Figure 2:
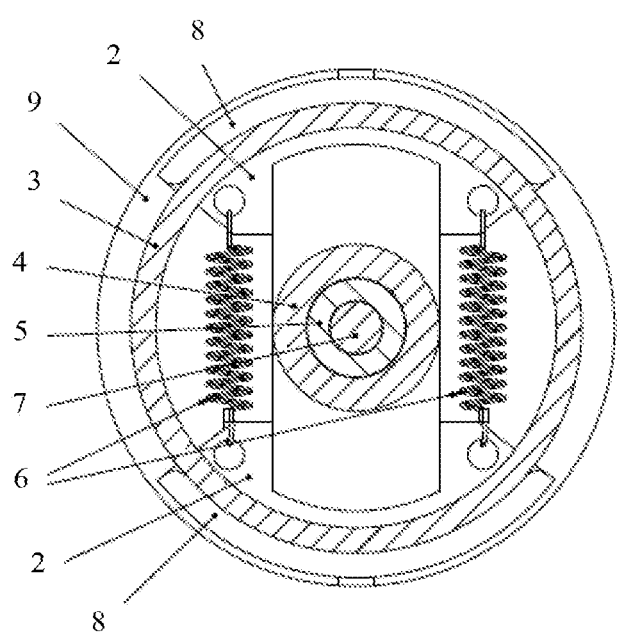
FIG. 2 is a cross-sectional view through a centrifugal brake.

FIG. 1 shows a schematic cutaway view through a drive actuator 1 according to the invention. The actuator is designed to be installed within a roller of a roller shutter, blind, projector screen or the like. The actuator comprises a drive motor 11 and a centrifugal brake 9. The motor is schematically shown in that although it appears as sectioned, the inner workings of the motor are not shown, except for the parts that are important to the working of the invention. The drive motor 11 has a rotor including a drive shaft 7 which is journalled in two motor bearings 12. The centrifugal brake is disposed at one end of the drive motor. A shaft flange 5 is fixed to drive shaft 7. A rotational disk 4 is fixedly coupled to shaft flange 5. Two centrifugal shoes 2 designed as circular segments are arranged symmetrically in rotational disk 4 such that they are smoothly guided to be radially moveable in rotational disk 4. Both are likewise connected to one another symmetrically at their ends using two spring elements 6, as represented in FIG. 2. However, centrifugal shoes 2 may be connected to one another using one, two, or more spring element(s) 6. Two partially annular brake shoes 8, designed to be angled when viewed in cross section, are arranged outside on centrifugal shoes 2 in the direction of the drive motor such that the brake shoes engage in a positive locking way on part of the surface of a friction ring 3 which is arranged and fixed on a surface of a housing 14 of the drive motor.

An elevation, designed here as a tooth-like centrifugal shoe projection 13, is arranged on each of the centrifugal shoes 2 facing in the direction of the rotational disk. As counterparts, two slot shaped recesses are arranged in rotational disk 4 into which centrifugal shoe projections 13 engage. If centrifugal shoes 2 are moved outward on the basis of the high start-up torque of drive motor 11, these narrowly delimited slots function as a stop 10 for tooth-like centrifugal shoe projections 13 and prevent centrifugal shoes 2 from further radially outward movement.

In the unenergized or stopped state of drive actuator 1, i.e., no voltage is applied to the motor terminals of drive motor 11, centrifugal shoes 2 engage, caused by correspondingly pretensioned spring elements 6, with friction ring 3, in this embodiment, solely in a positive-locking way, and reliably lock drive actuator 1 and prevent or resist further deployment of the blind, screen or similar device which is arranged to be driven by the drive actuator. The dimensioning of centrifugal brake 9 is thereby carried out such that it exerts a sufficient holding torque for the blind, shutter, etc. The positive locking connection may be carried out if both the brake shoe surface of centrifugal shoes 2 directed inward and lying on the friction ring and the outer surface of friction ring 3 engage or for example, are designed as sawtooth shaped. Spring elements 6 are pretensioned such that brake shoes 8 effect a sufficient retaining torque and the drive actuator 1 is locked at the desired position.

When drive actuator 1 is activated by a voltage applied to the motor terminals of drive motor 11, the motor rotates, and centrifugal shoes 8 release from the surface of friction ring 3 on the basis of the centrifugal force, i.e., they move out of engagement. The radial displacement of brake shoes 8 is maintained until the current is switched off, and drive motor 11 comes to a stop. Centrifugal shoes 2 with angled brake shoes 8 are drawn radially inward by spring elements 6 and brake shoes 8 engage in a positive-locking way again with friction ring 3 and function again as a reliable locking mechanism.

FIG. 2 shows a radial cutaway through centrifugal brake 9. It shows the circular segment design of the two centrifugal shoes 2, their arrangement and their connection to one another by means of spring elements 6. Brake shoes 8 of centrifugal shoes 2 lie in this case directly on a radially outer surface of friction ring 3 and effect the locking. In addition, it is shown how centrifugal shoes 2 are positioned and guided by rotational disk 4.

Figure 3:
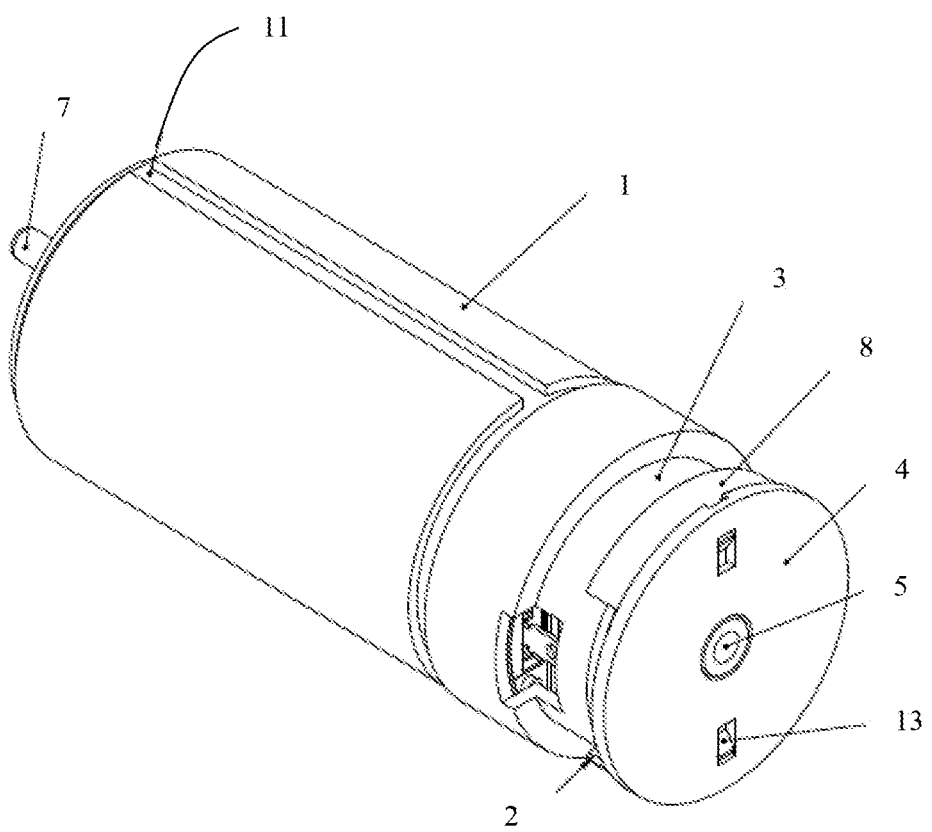
FIG. 3 illustrates the assembled drive actuator of FIG. 1.

FIG. 3 shows an oblique view of a drive actuator 1, in which the slot-shaped recesses are visible which form stops 10 in rotational disk 4. It likewise shows how centrifugal shoe projections 13 are arranged, how these engage into the recesses, and thus function as stops for centrifugal shoes 2. Brake shoes 8 of centrifugal shoes 2 are designed as half rings in this example and cover more than 55 percent of the circumference of friction ring 3. They may also, however enclose more of the circumferential surface. The above described technical solution is primarily usable as a drive actuator for blinds and the like, in particular for Venetian blinds, Holland blinds, roller shutters and screens in various installation sizes.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A drive actuator, comprising: a drive motor, including a drive shaft and a motor housing; and a centrifugal brake coupled to the drive motor, the centrifugal brake comprises:
   a rotational disk coupled to the drive shaft;
   a friction ring fixed with respect to the motor housing;
   two or more centrifugal shoes arranged to be radially moveable between an inner position and an outer position and guided in the rotational disk; and
   at least one spring element urging the centrifugal shoes radially inwardly towards the inner position,
   wherein the centrifugal shoes engage frictionally or in a positive-locking way with the frictional ring when the drive motor is stationary, and move out of engagement with the friction ring when the drive motor is rotating.

2. The drive actuator of claim 1, wherein the rotational disk is coupled to the drive shaft via a shaft flange.

3. The drive actuator of claim 1, wherein a stop is formed in the rotational disk to limit the radially outward movement of the centrifugal shoes.

4. The drive actuator of claim 3, wherein each centrifugal shoe has a projection arranged to engage the stop.

5. The drive actuator of claim 4, wherein the stop is formed by a pair of recesses formed in the rotational disk and each projection extends into a respective recess.

6. The drive actuator of claim 1, wherein the friction ring is fixed to the motor housing.

7. The drive actuator of claim 1, wherein each centrifugal shoe has a brake shoe arranged to engage a radially outer surface of the friction ring.

8. The drive actuator of claim 7, wherein the brake shoes and the friction ring have a non-smooth contact surface creating positive locking engagement when the brake shoes engage the friction ring.

9. The drive actuator of claim 8, wherein the non-smooth contact surfaces have a saw-tooth configuration.

10. The drive actuator of claim 1, wherein the centrifugal shoes are interconnected by the at least one spring element.

11. The drive actuator of claim 10, wherein there are two spring elements interconnecting the centrifugal shoes.

* * * * *